(12) United States Patent
Ferrari et al.

(10) Patent No.: US 10,615,697 B1
(45) Date of Patent: Apr. 7, 2020

(54) MULTI-LEVEL SWITCHING CONVERTER WITH FLYING CAPACITOR VOLTAGE REGULATION

(71) Applicant: Dialog Semiconductor (UK) Limited, London (GB)

(72) Inventors: Lorenzo Ferrari, Leghorn (IT); Antonio Iannuzziello, Pisa (IT); Roberto Puddu, Leghorn (IT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/287,317

(22) Filed: Feb. 27, 2019

(51) Int. Cl.
| | |
|---|---|
| *H02M 3/158* | (2006.01) |
| *H02M 3/18* | (2006.01) |
| *H02M 7/483* | (2007.01) |
| *H02M 1/00* | (2006.01) |
| *H02M 1/088* | (2006.01) |

(52) U.S. Cl.
CPC .......... *H02M 3/1584* (2013.01); *H02M 3/18* (2013.01); *H02M 1/088* (2013.01); *H02M 2001/0003* (2013.01); *H02M 2007/4835* (2013.01)

(58) Field of Classification Search
CPC . H02M 2001/0003; H02M 2001/0045; H02M 1/088; H02M 3/04; H02M 3/18; H02M 3/156; H02M 3/1584; H02M 2003/1586; H02M 7/483; H02M 2007/4835
See application file for complete search history.

(56) References Cited

U.S. PATENT DOCUMENTS

| | | | |
|---|---|---|---|
| 9,748,841 B2 | 8/2017 | Granato et al. | |
| 9,929,653 B1* | 3/2018 | Mercer | H02M 3/158 |
| 10,050,515 B1* | 8/2018 | Chakraborty | H02M 1/32 |
| 10,090,763 B1* | 10/2018 | Mercer | H02M 3/1582 |
| 10,199,924 B2* | 2/2019 | Fu | H02M 3/158 |
| 2007/0013434 A1 | 1/2007 | Peschke | |
| 2007/0296383 A1* | 12/2007 | Xu | H02M 1/14 323/282 |
| 2014/0232364 A1* | 8/2014 | Thomas | H02M 7/483 323/271 |

(Continued)

OTHER PUBLICATIONS

"Multi-Level Conversion: High Voltage Choppers and Voltage-Source Inverters," PESC '92 Record. 23rd Annual IEEE Power Electronics Specialists Conference, Jun. 29, 1992, pp. 397-403.

*Primary Examiner* — Nguyen Tran
*Assistant Examiner* — David A. Singh
(74) *Attorney, Agent, or Firm* — Saile Ackerman LLC; Stephen B. Ackerman

(57) ABSTRACT

A multi-level switching converter and a method which converts an input voltage provided at an input node to an output voltage provided at an output node is described. The multi-level switching converter has a first converter branch with a first set of switches and a first flying capacitor, and a second converter branch with a second set of switches and a second flying capacitor. Furthermore, the switching converter has a joint inductor for the first and second converter branch, and control circuitry. The control circuitry controls the first and second set of switches to set the output voltage in accordance to a reference voltage, and by doing so it provides a robust regulation of the capacitor voltages across the first and second flying capacitors.

18 Claims, 14 Drawing Sheets

(56) References Cited

U.S. PATENT DOCUMENTS

| | | | |
|---|---|---|---|
| 2015/0009734 A1* | 1/2015 | Stahl | H02M 7/483 |
| | | | 363/98 |
| 2015/0288287 A1* | 10/2015 | Madawala | H02M 1/12 |
| | | | 363/21.01 |
| 2016/0315539 A1* | 10/2016 | Lee | H02M 3/158 |
| 2016/0344214 A1* | 11/2016 | Petersen | H02M 3/158 |
| 2018/0006559 A1* | 1/2018 | Chen | H02M 1/08 |
| 2018/0069472 A1* | 3/2018 | Wei | H02M 3/07 |

* cited by examiner

MULTI-LEVEL SWITCHING CONVERTER WITH FLYING CAPACITOR VOLTAGE REGULATION

TECHNICAL FIELD

The present document relates to multi-level switching converters. In particular, the present document relates to the regulation of the voltage across the flying capacitors of a multi-level switching converter.

BACKGROUND

Multi-Level Switching Converters may be used to convert power at an input voltage into power at an output voltage. A multi-level switching converter comprises at least one flying capacitor, wherein the voltage across the flying capacitor may be regulated to a certain target level during operation of the multi-level converter.

SUMMARY

The present document addresses the technical problem of providing an efficient and reliable scheme for regulating the voltage level across the flying capacitor of an interleaved multi-level switching converter. The technical problem is solved by the independent claims. Preferred examples are described in the dependent claims. According to an aspect, an interleaved multi-level switching converter is described, which is configured to convert an input voltage provided at an input node to an output voltage provided at an output node. The interleaved multi-level switching converter comprises a first branch of switches and a first flying capacitor, and a second branch of switches and a second flying capacitor. In addition, the interleaved multi-level switching converter comprises a joint inductor for the first and second branch, and a control circuitry. The control circuitry is configured to control the first and second branch of switches to set the output voltage in accordance to a reference voltage, and to set capacitor voltages across the first and second flying capacitors in accordance to a target voltage.

According to another aspect, a method corresponding to the multi-level switching converter described in the present document is described.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
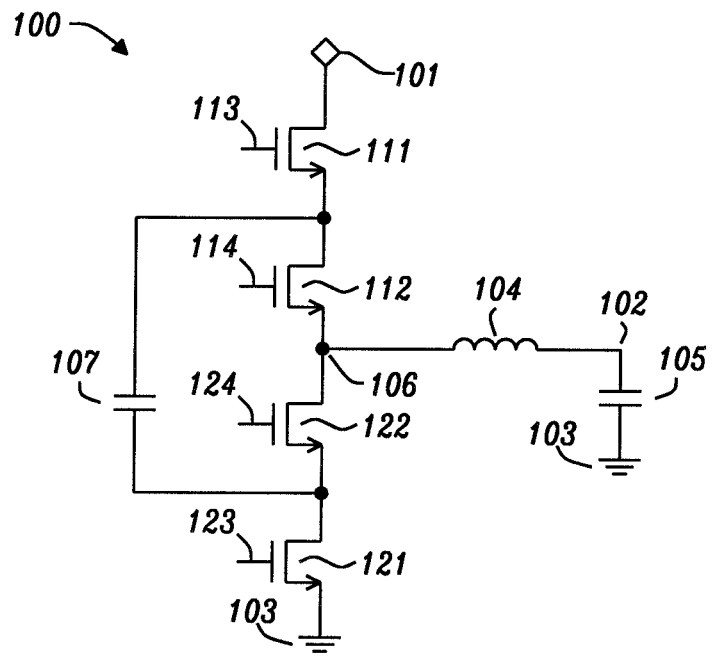
FIG. 1 illustrates an example multi-level switching converter.

As indicated above, the present document is directed at controlling and/or regulating the capacitor voltage across the flying capacitor of a multi-level switching converter in an efficient and precise manner. In this context, FIG. 1 shows an example multi-level switching converter 100 comprising a first high side switch 111 (controlled via a first high side control signal 113) and a second high side switch 112 (controlled via a second high side control signal 114). In addition, the example multi-level switching converter 100 comprises a first low side switch 121 (controlled via a first low side control signal 123) and a second low side switch 122 (controlled via a second low side control signal 124). The midpoint 106 (also referred to as an intermediate node) between the high side switches 111, 112 and the low side switches 121, 122 is coupled to an output node of the converter 100 via an inductor 104. The voltage at the output node is referred to as the output voltage 102. The output node typically exhibits an output capacitor 105 arranged between the output voltage 102 and a ground potential 103.

The high side switches 111, 112 and the low side switches 121, 122 are arranged in series between an input voltage 101 and the ground potential 103, wherein a flying capacitor 107 is arranged between the midpoint between the high side switches 111, 112 and the midpoint between the low side switches 121, 122.

Figure 2A:
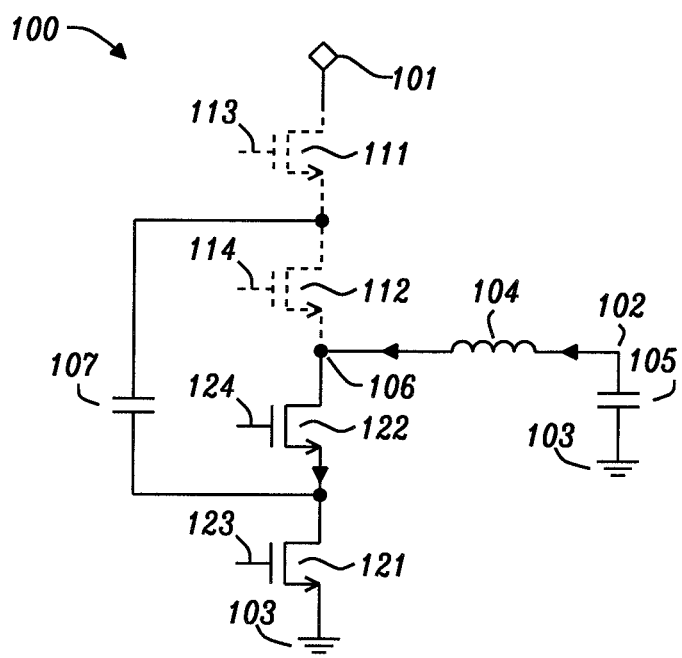
FIGS. 2A to 2C show example operation states of the converter of FIG. 1.
Figure 2B:
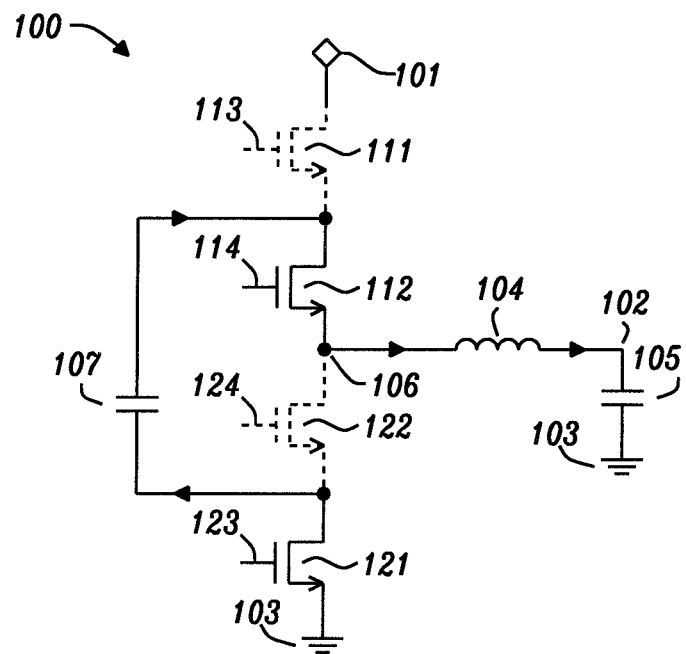
Figure 2C:
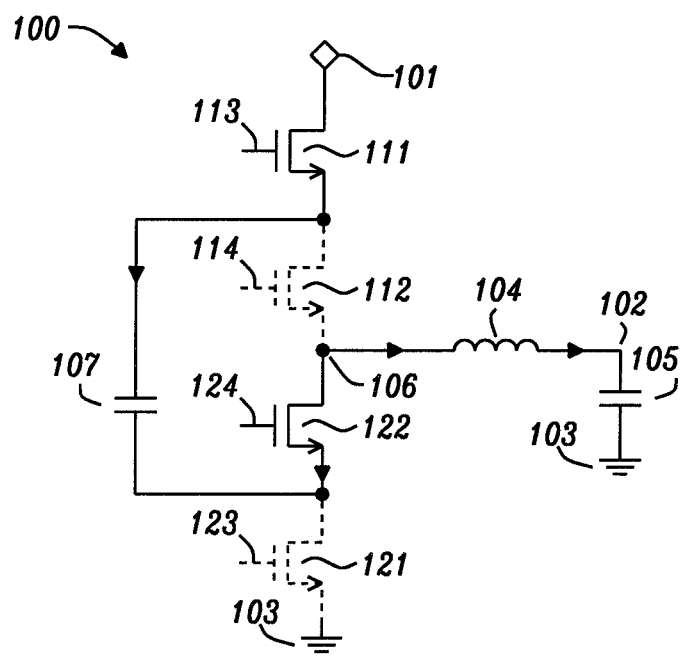

The switches 111, 112, 121, 121 may be used to arrange the flying capacitor 107 in various different manners during different operation states, in order to regulate the output voltage 102 to a certain reference voltage. Example operation states are shown in FIGS. 2A to 2C.

In particular, FIG. 1 shows a multi-level buck converter which comprises four switches, a first high side switch 111 (HS1), a second high side switch 112 (HS2), a first low side switch 121 (LS1) and a second low side switch 122 (LS2), an inductor 104 and a flying capacitor 107 (Cfly).

The converter 100 may cycle between four states:
State S0: HS1=off; HS2=off; LS2=on; LS1=on
State S1: HS1=off; HS2=on; LS2=off; LS1=on State S2: HS1=on; HS2=off; LS2=on; LS1=off
State S3: HS1=on; HS2=on; LS2=off; LS1=off Depending on the duty cycle of the converter 100, the pattern or sequence of these states (with each cycle) may be as follows:

Duty cycle lower than 50%: S0, S1, S0, S2; and/or
Duty cycle greater than 50%: S3, S1, S3, S2.

FIG. 2A illustrates the state S0, FIG. 2B illustrates the state S1 and FIG. 2C illustrates the state S2. The dark-colored sections of the Figures illustrate the components which are conductively coupled with one another (due to the switches being on or closed). The light-colored sections of the Figures illustrate the isolated components (due to switches being off or open).

During state S0 the flying capacitor 107 is floating and its voltage (referred to as the capacitor voltage) does not change. The inductor current through the inductor 104 exhibits a negative slope and the inductor (or coil) 104 is discharged. During state S1, the negative terminal of the flying capacitor 107 is coupled to the ground potential 103 VSS and the positive terminal of the flying capacitor 107 is coupled to the intermediate node 106 (also referred to as the LX node). In this condition, the flying capacitor 107 provides current to the coil 104 and as a consequence the flying capacitor 107 is discharged. During state S2, the positive terminal of the flying capacitor 107 is connected to the input voltage 101 VIN and the negative terminal of the flying capacitor 107 is coupled to the intermediate node LX 106. In this condition, both the coil 104 and the flying capacitor 107 are charged with the same current.

Figure 2D:
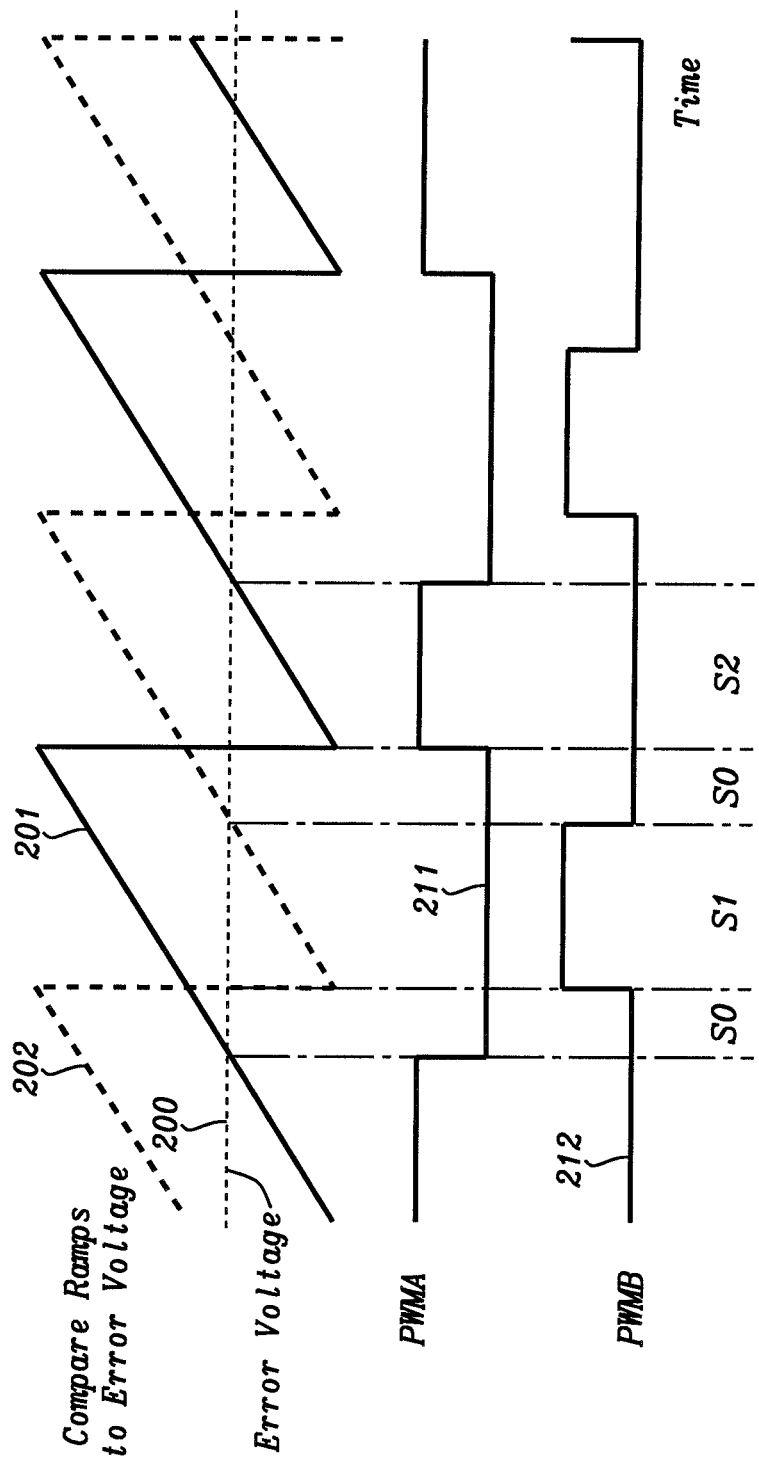
FIG. 2D shows example ramp and control signals for operating the converter of FIG. 1.
Figure 3A:
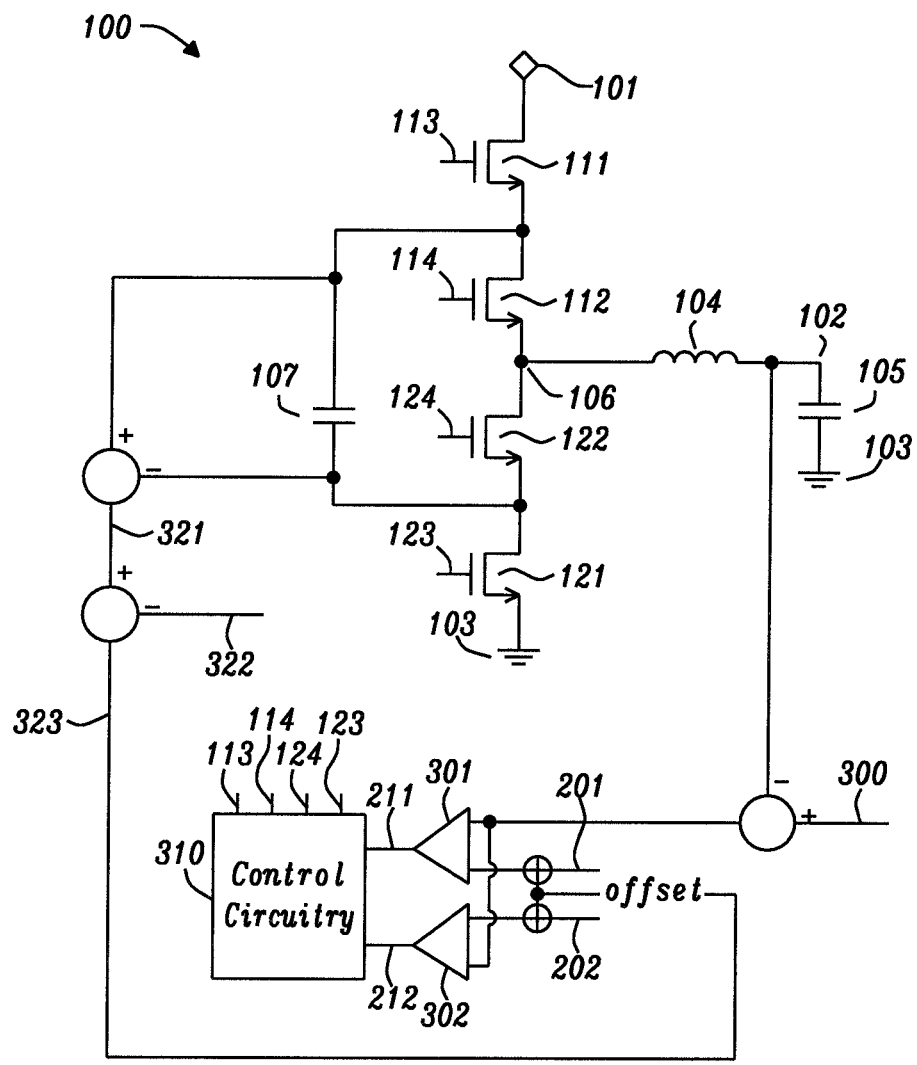
FIG. 3A illustrates example control loops for regulating the output voltage at the output node of a multi-level switching converter and for regulating the capacitor voltage across the flying capacitor of the multi-level switching converter.

The duration of each state and the regulation of the output voltage 102 may be achieved using a control loop, as illustrated in FIG. 3A. The control loop may be configured to compare the error voltage 200, i.e. the difference between the output voltage 102 and the reference voltage 300, with two equal ramps 201, 202 which are shifted by half of the period or cycle with respect to one another. As the result of the comparison between the ramps 201, 202 and the error voltage 200, two signals PWMA 211 and PWMB 212 are generated and used to drive the switches 111, 112, 121, 122 within the different states of a cycle or period. FIG. 2D illustrates how the PWM (pulse width modulated) signals 211, 212 may be generated by comparing the error voltage 200 with the ramps 201, 202 (within comparator units 301, 302, respectively). PWMA=LOW and PWMB=LOW may indicate the state S0; PWMA=LOW and PWMB=HIGH may indicate the state S1; and PWMA=HIGH and PWMB=LOW may indicate the state S2. The control signals 123, 124 for the switches 111, 112, 121, 122 may be determined within control circuitry 310.

Furthermore, an additional loop may be used to regulate the capacitor voltage 321 across the flying capacitor 107 to a target voltage 322. In particular, the flying capacitor 107 may be maintained charged to half of the input voltage 101 (i.e. VCFLY=VIN/2). In other words, the target voltage 322 may be VIN/2.

In case the capacitor voltage 321 across the flying capacitor 107 is not equal to the target voltage 322, the control loop shown in FIG. 3a changes the duration of states S1 and S2, while keeping the sum of the duration of the states S1 and S2 constant, in order to not alter the output voltage 102 (Vout). This may be achieved by offsetting the first ramp 201 with a positive offset and the second ramp 202 with a negative offset, wherein the offset may be equal to the voltage difference 323 between the capacitor voltage 321 and the target voltage 322.

For example, if the capacitor voltage 321 VCFLY is greater than the target voltage 322 (e.g. VIN/2), the loop increases the duration of state S1, which is the state during which the flying capacitor 107 is discharged. At the same time the duration of the state S2 is reduced by the same amount. One way of controlling the duration of the states is by altering the average value of the ramps 201, 202 (i.e. by offsetting the ramps 201, 202 with a positive or negative offset). If the capacitor voltage 321 across the flying capacitor 107 is regulated, the loop does not affect the circuit and the two ramps 201, 202 have the same average value (i.e. there is no offset between the ramps 201, 202).

Figure 3B:
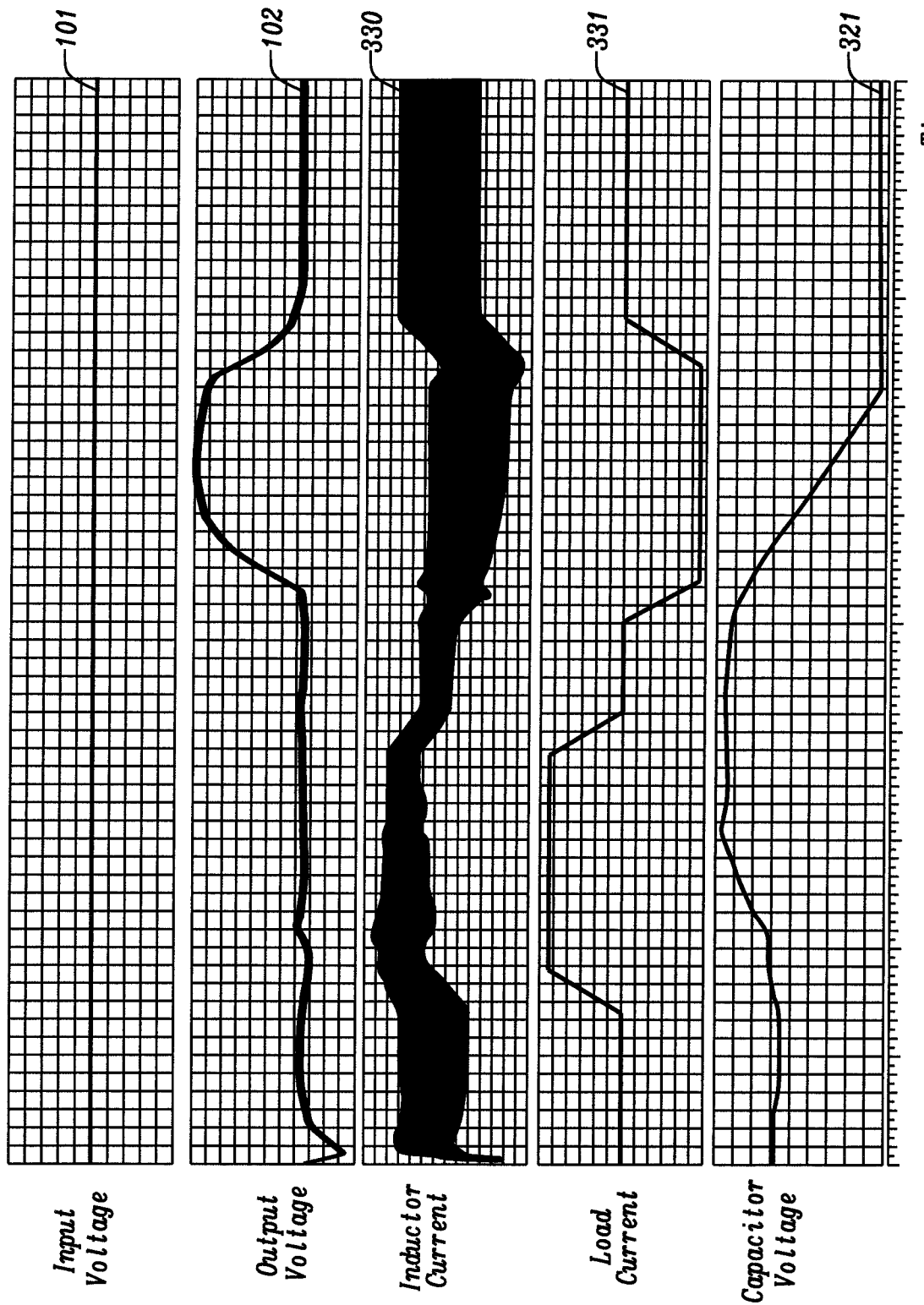
FIG. 3B shows example signals during the operation of the multi-level switching converter of FIG. 1.

FIG. 3B shows the results of a simulation in which the load (i.e. the load current 331) at the output node of the converter 100 is changed from 0 to 2.7 A and then from 0 to −2.7 A. FIG. 3B also shows the current 330 through the coil 104. It can be seen that for a negative inductor current, the control loop for setting the capacitor voltage 321 is not able to regulate the capacitor voltage 321 across the flying capacitor 107. This is due to the fact that the control loop is based on the assumption that the flying capacitor 107 is discharged when the converter 100 is in state S1 and that the flying capacitor 107 is charged when the converter 100 is in state S2. This assumption only holds if the inductor current 330 is positive. On the other hand, when the inductor current 330 goes negative, the loop changes polarity and as a result, the capacitor voltage 321 of the flying capacitor 107 goes out of regulation.

In the following multi-level converters 100 are described, which do not require the use of an additional loop for regulating the capacitor voltage 321 across the flying capacitor 107, thereby reducing the complexity of the converter 100 and thereby enabling stable operation of the converter 100 with negative inductor current 330. The converters 100 make use of an open loop mechanism to regulate the capacitor voltage 321 of a multi-level switching converter 100, wherein the open loop mechanism acts as a charge-pump. This charge-pump may be provided as an additional structure or it may be implemented in an efficient manner by controlling the operation states of an interleaved converter.

Figure 4A:
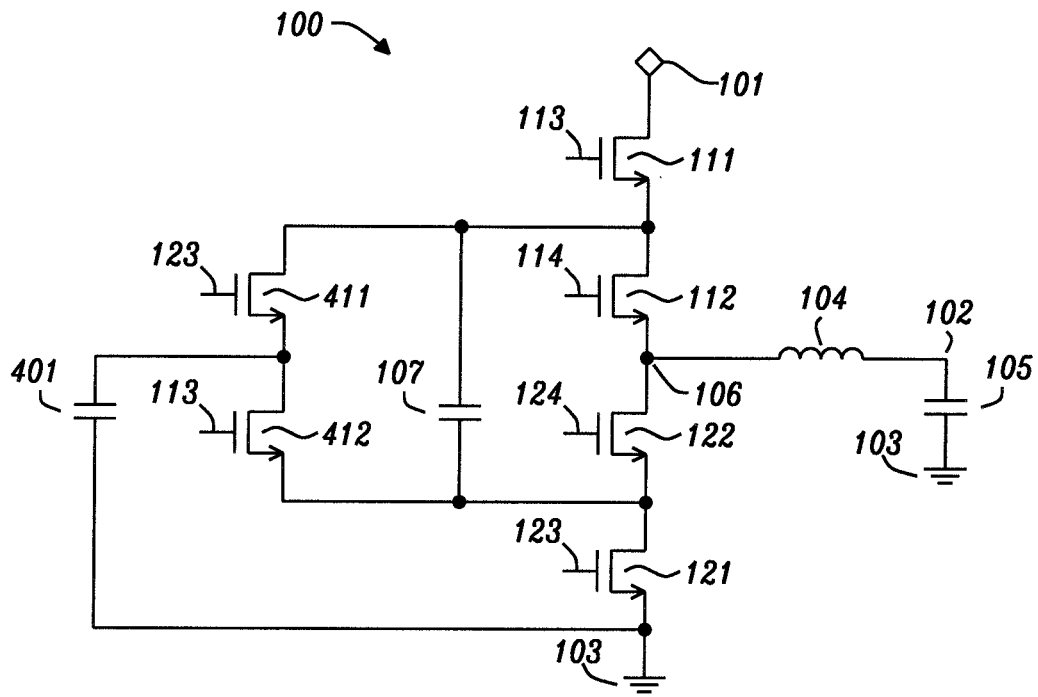
FIG. 4A illustrates a charge pump for regulating the capacitor voltage across the flying capacitor of a multi-level switching converter.
Figure 4B:
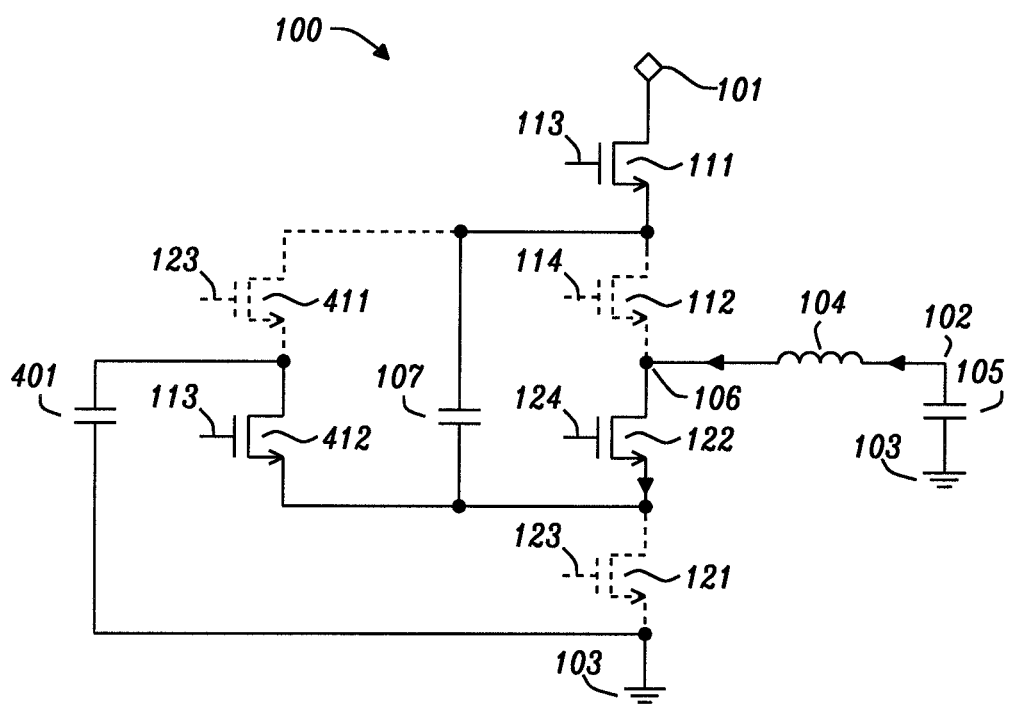
FIGS. 4B and 4C show example operation states of the multi-level switching converter of FIG. 4A.
Figure 4C:
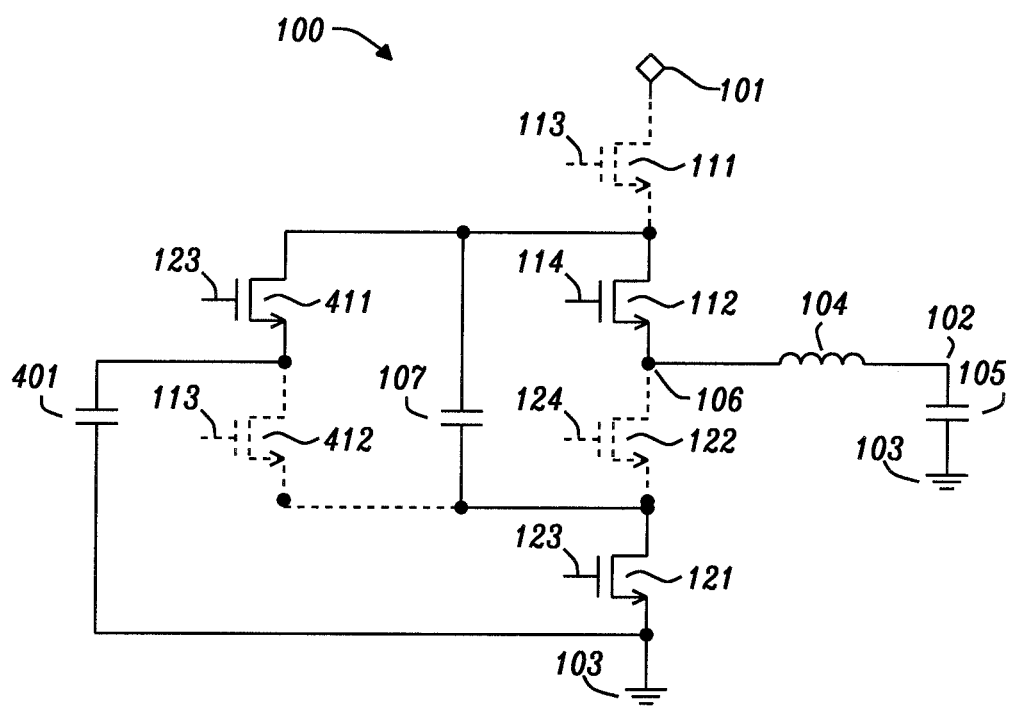

FIG. 4A shows a multi-level switching converter 100 with an additional charge pump comprising a reservoir capacitor 401 and an additional high side switch 411 and an additional low side switch 412. The charge pump 401, 411, 412 works in parallel with the dc-dc converter 100 and makes use of the same control signals 113 (i.e. of the first high side control signal and the first low side control signal) without the need for an additional control loop. The capacitor voltage 321 across the flying capacitor 107 is regulated to Vin/2 by alternatively connecting the flying capacitor 107 in series with the external reservoir capacitor 401 (operation state S2 according to FIG. 4B) and parallel with the external reservoir capacitor 401 (operation state S1 according to FIG. 4C). These connections are made during the different operation states (notably during states S2 and S1, respectively) of the multi-level converter 100. In particular, in case of a cycle comprising the operation states S0, S1, and S2 (for a duty cycle lower than 50%), the state which is used to charge the serial arrangement of the flying capacitor 107 and the reservoir capacitor 401 is the state S2 (see FIG. 4B), wherein during state S1 (see FIG. 4C) the capacitors 107, 401 are connected in parallel and discharged to the output node of the converter 100.

Figure 5:
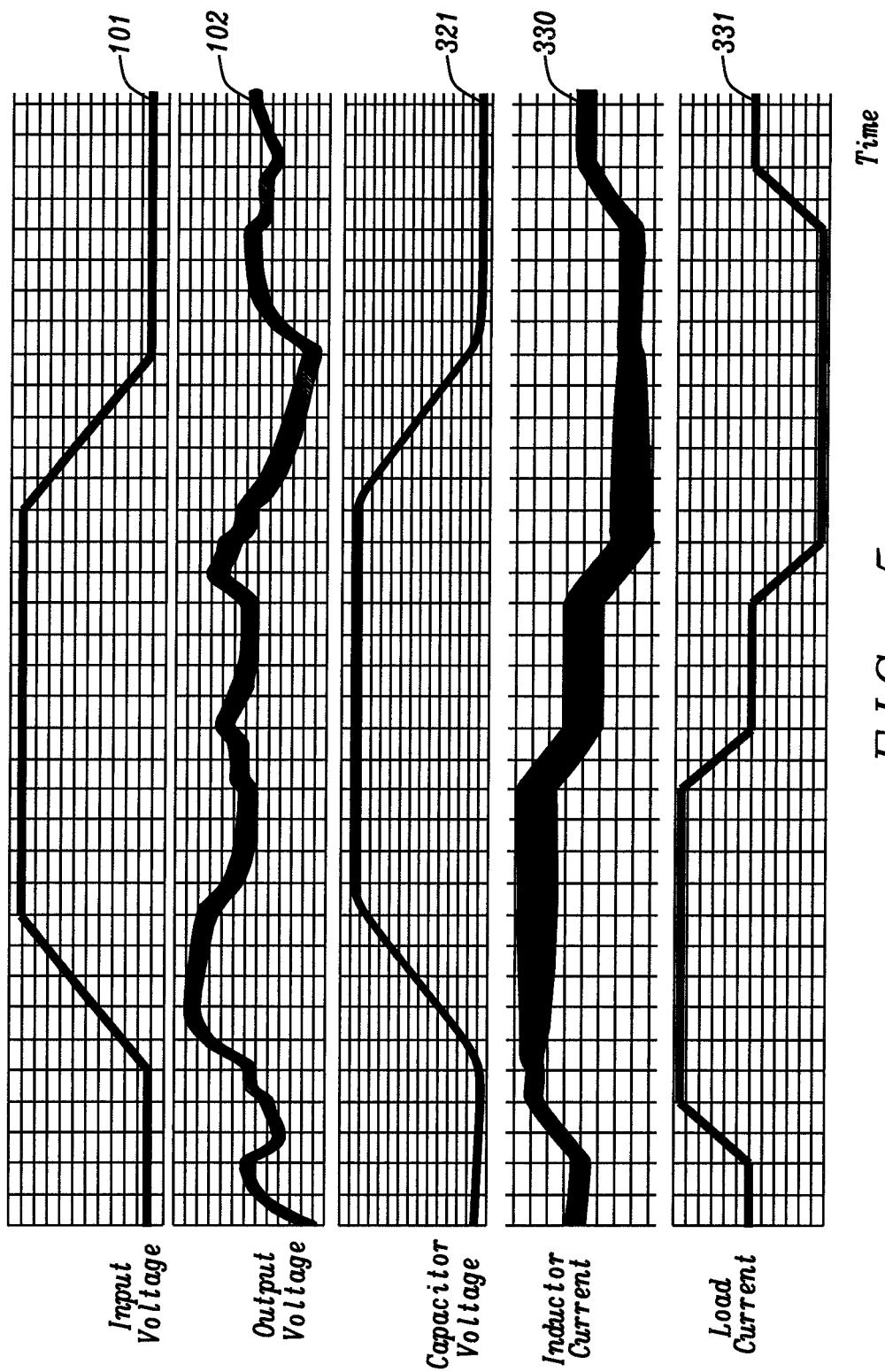
FIG. 5 shows example signals during the operation of the multi-level switching converter of FIG. 4A.

As can be seen from FIG. 5, the capacitor voltage 321 is regulated to VIN/2 in a reliable manner, also in case of a negative inductor current 330, when using the architecture illustrated in FIG. 4A.

Figure 6:
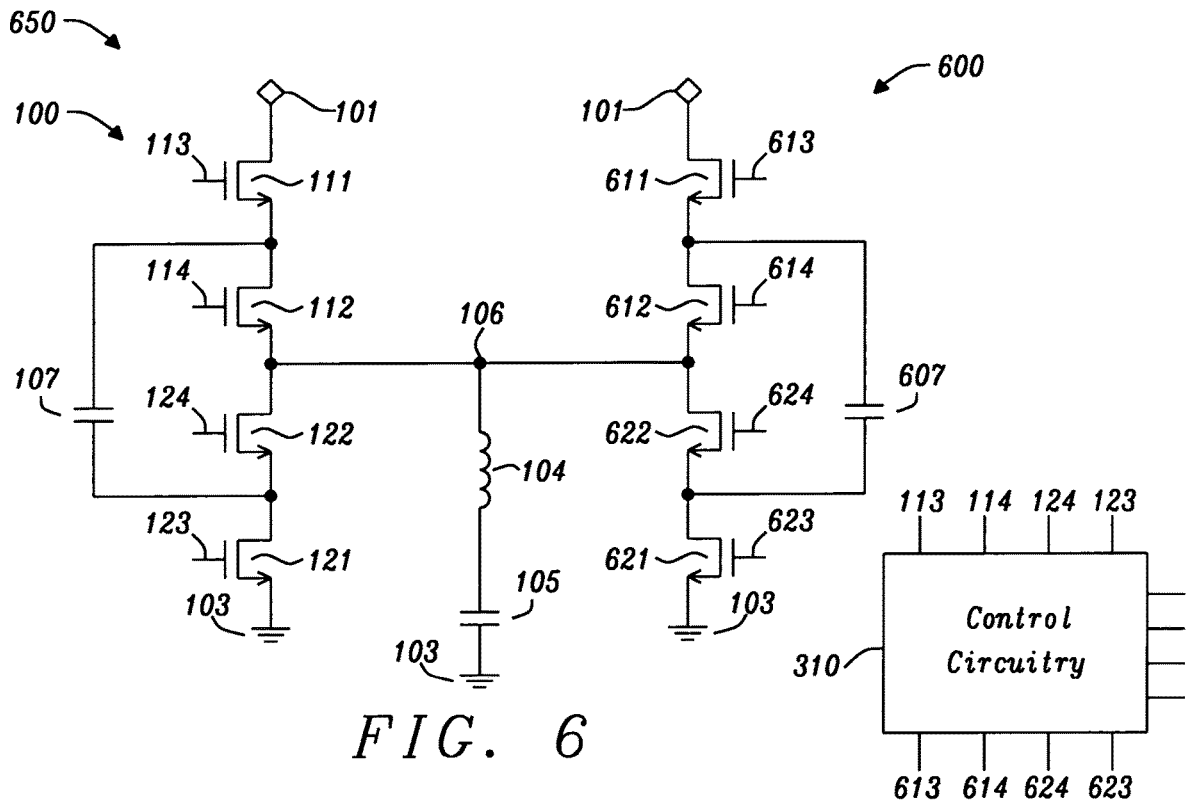
FIG. 6 illustrates an example interleaved multi-level switching converter.

The use of a dedicated reservoir capacitor 401 may be avoided, when operating an interleaved multi-level converter 650 comprising at least two converter branches 100, 600 as illustrated in FIG. 6. In other words, the capacitor voltage 321 across the flying capacitor 107, 607 of a multi-level switching converter 100, 600 may be controlled in a particularly efficient manner without the need of an external loop by using an interleaved multi-level (notably three-level) converter 650 connected in a H-bridge fashion, as illustrated in FIG. 6.

A single inductor 104 is shared between the two converter branches 100, 600, with each converter branch 100, 600 having its own flying capacitor 107, 607. The first converter branch 100 comprises the switches 111, 112, 121, 122, which are controlled by the control signals 113, 114, 123, 124, respectively. The second converter branch 600 comprises corresponding switches 611, 612, 621, 622, which are controlled by the control signals 613, 614, 623, 624, respectively.

The control signals 113, 114, 123, 124 for controlling the switches 111, 112, 121, 122 of the first converter branch 100 may be generated using the control circuitry 310 as shown in FIG. 3A. Correspondingly, the control signals 613, 614, 623, 624 for controlling the switches 111, 112, 121, 122 of the first converter branch 100 may be generated in an analogous or similar manner, e.g., also using the control circuitry 310 as shown in FIG. 3A, as will be understood and appreciated by the skilled person.

By defining the switching pattern of the switches of the two converter branches 100, 600 properly, it is possible to connect the two flying capacitors 107, 607 alternatively in series and parallel with respect to one another, thereby implementing a divide by two charge pump.

Figure 7A:
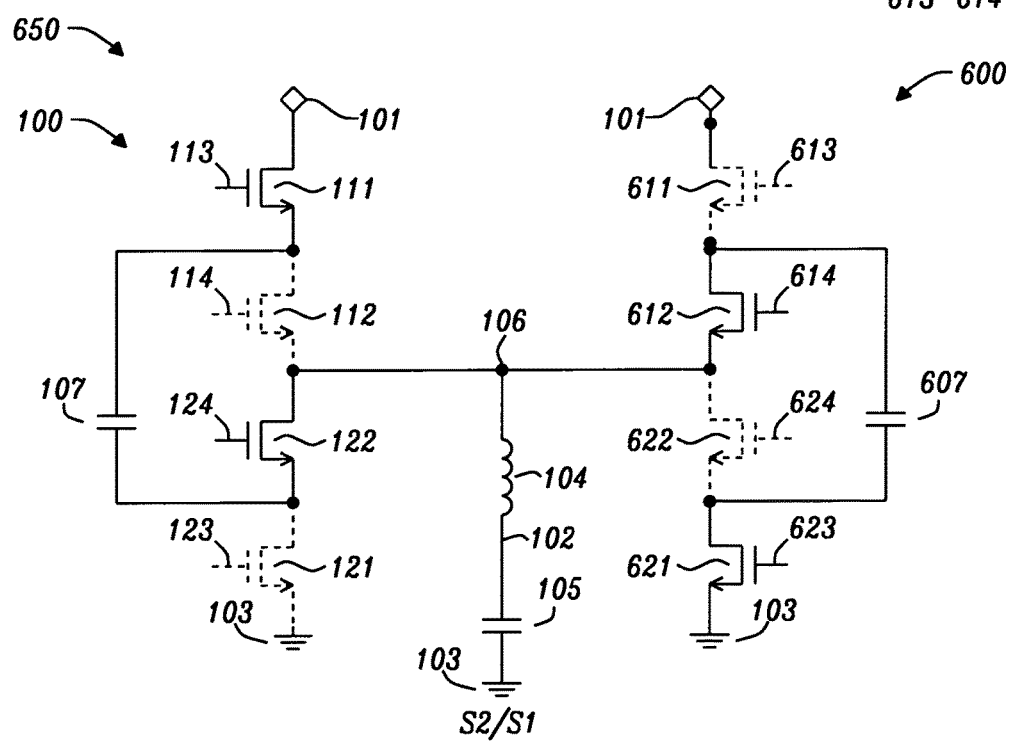
FIGS. 7A to 7F show example operation states for the converter of FIG. 6.
Figure 7B:
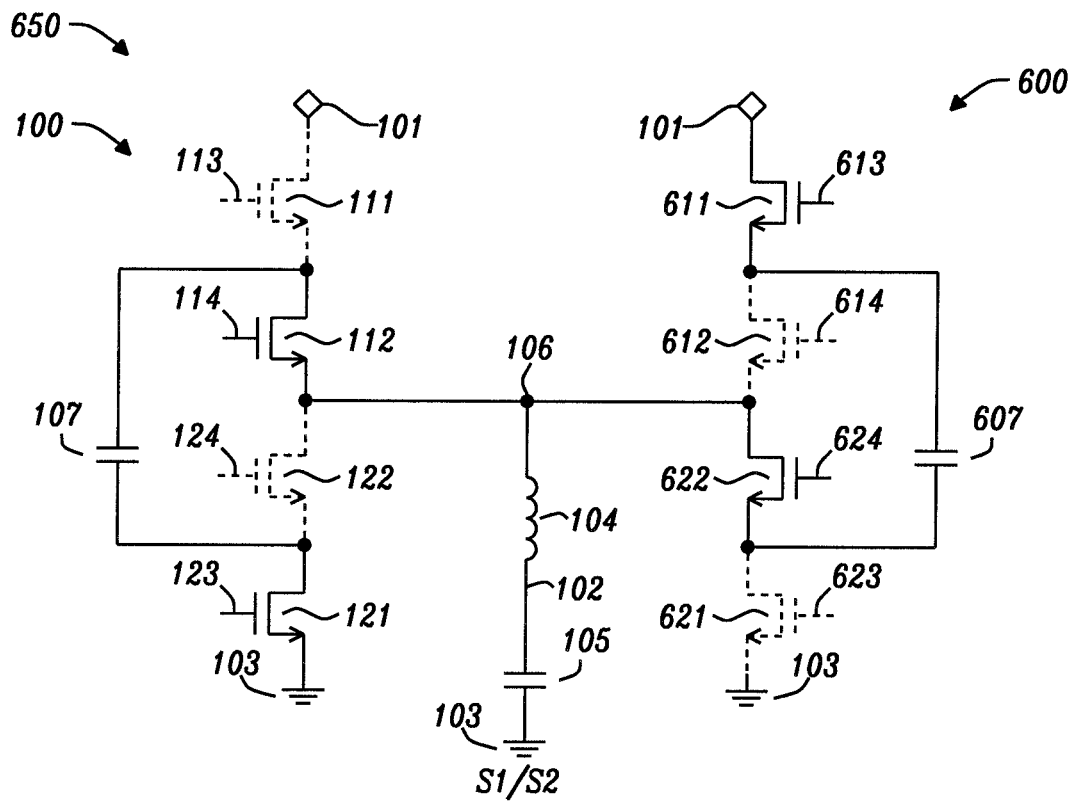
Figure 7C:
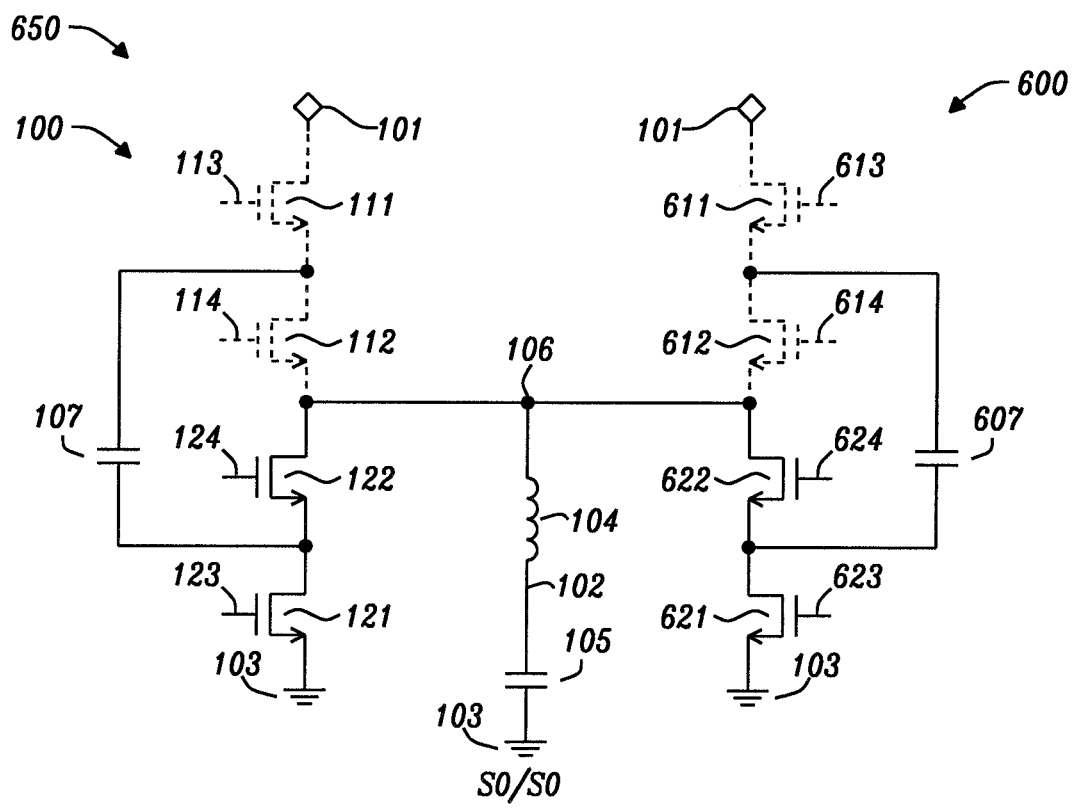

The two converter branches 100, 600 of the converter 650 are typically operated in a non-overlapping manner, such that when the first converter branch 100 is in S2, the second converter branch 600 is in S1 (and vice versa). Considering the case of a duty cycle less than 50%, the following pattern may be used to control the power converter 650: S2/S1-S0/S0-S1/S2-S0/S0, wherein the notation "S2/S1" indicates that the first converter branch 100 is in operation state S2 and that the second converter branch 600 is in operation state S1. The combined operation state "S2/S1" is shown in FIG. 7A, the combined operation state "S1/S2" is shown in FIG. 7B and the combined operation state "S0/S0" is shown in FIG. 7C.

Figure 7D:
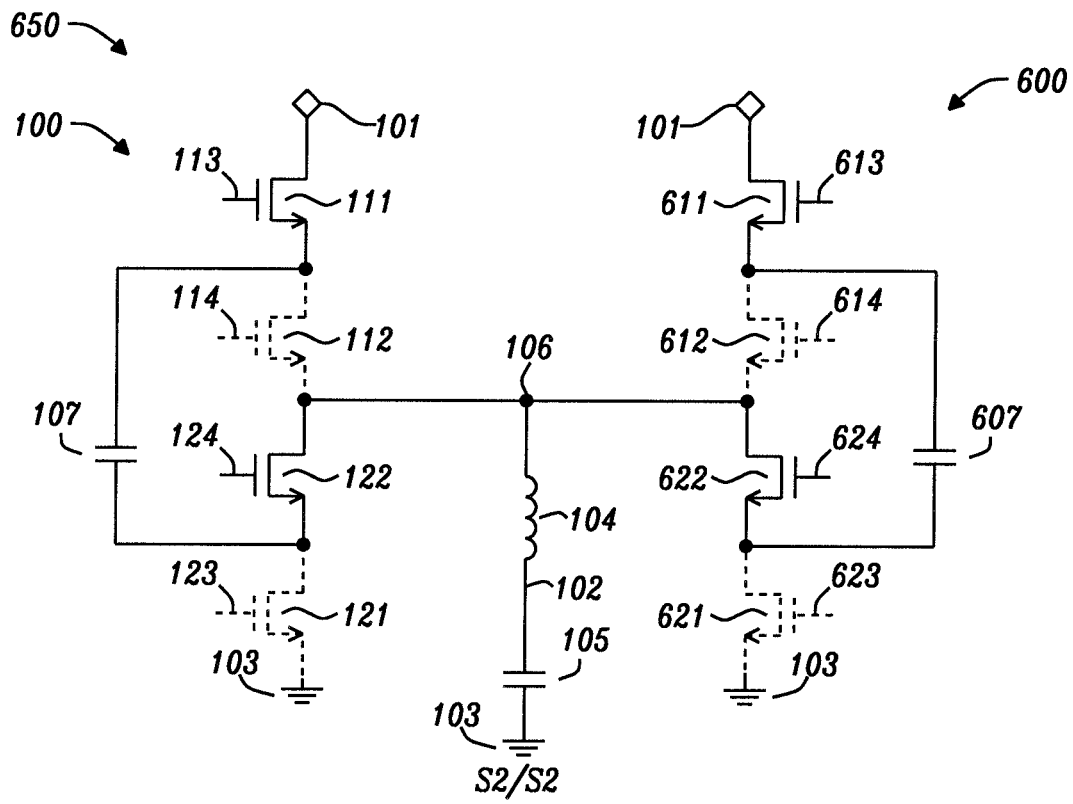
Figure 7E:
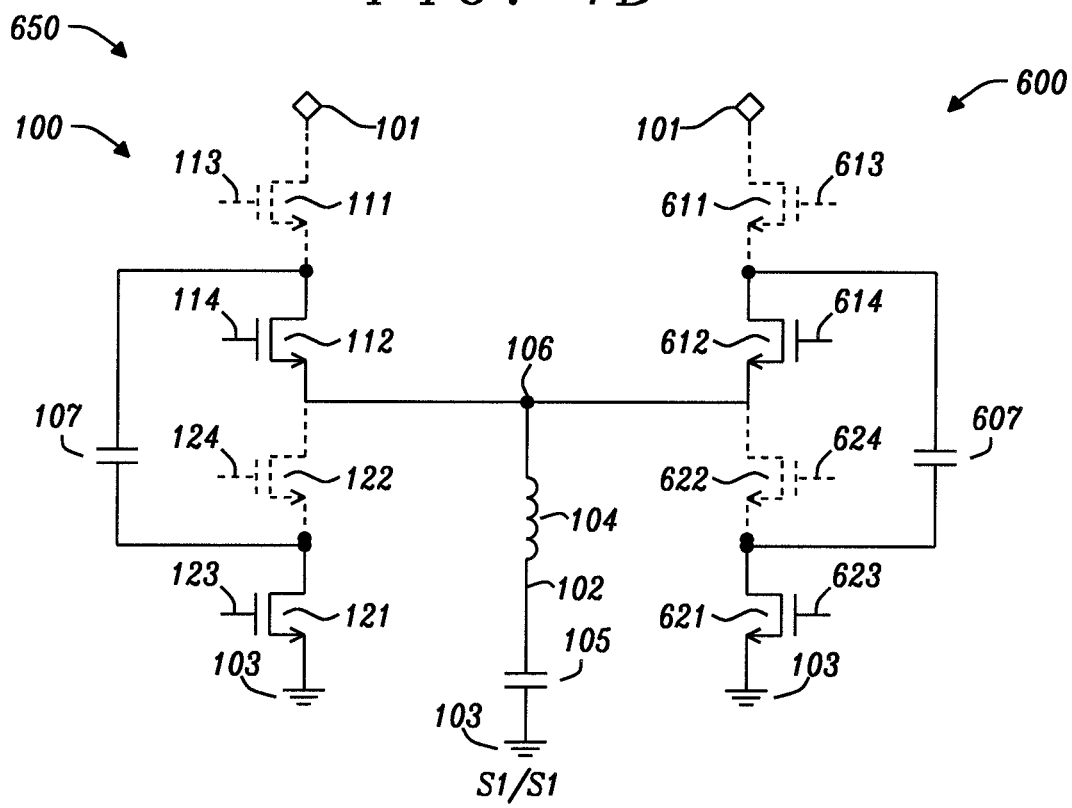

Furthermore, two additional combined operation states are defined, a combined operation state "S2/S2" (see FIG. 7D) and operation state "S1/S1" (see FIG. 7E) during which both flying capacitors 107, 607 are arranged in parallel. Considering the case of a duty cycle less than 50%, a possible pattern or sequence for operating the converter 650 may be S2/S1-S0/S0-S2/S2-S0/S0-S1/S2-S0/S0-S1/S1-S0/S0. When the converter 650 is in operation states S2/S1 and S1/S2 the flying capacitors 107, 607 are connected in series while when in operation states S2/S2 and S1/S1 the flying capacitors 107, 607 are connected in parallel, thereby implementing a divide by two charge pump, which ensures the regulation of the capacitor voltage 321 across the flying capacitors 107, 607.

Figure 7F:
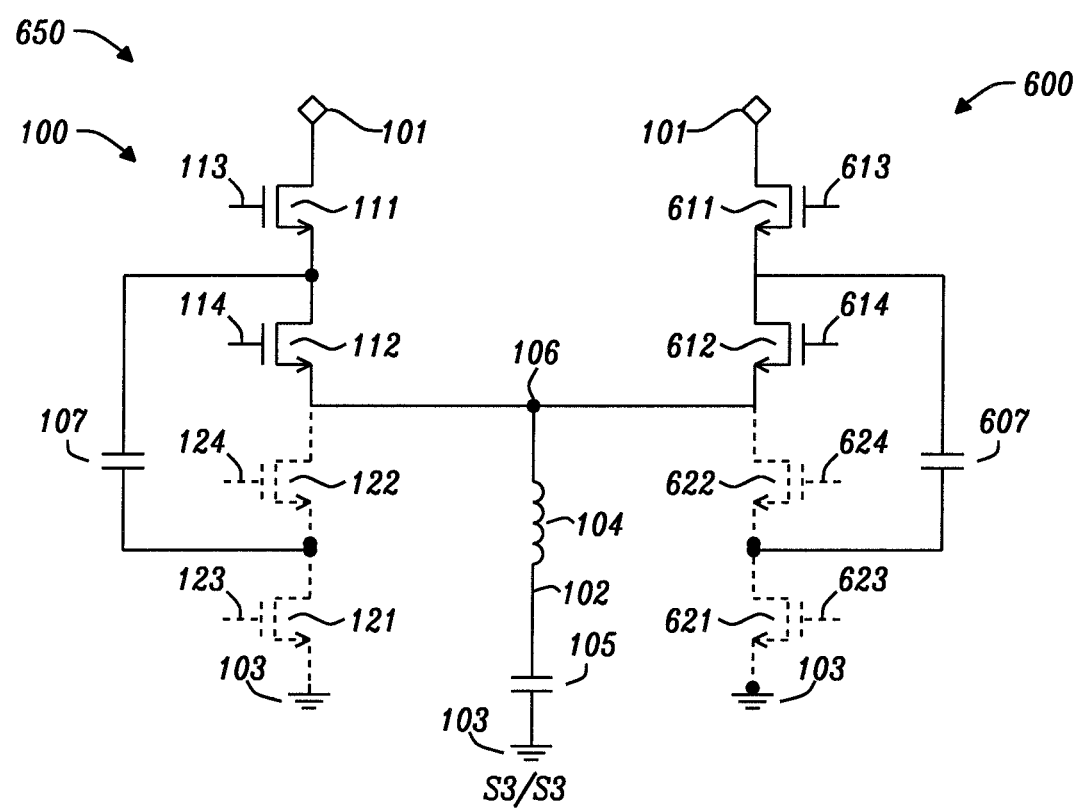

Furthermore, FIG. 7F shows a further operation state S3/S3, during which the high side switches 111, 112, 611, 612 in both converter branches 100, 600 are closed, and during which the low side switches 121, 122, 621, 622 in both converter branches 100, 600 are open. As a result of this, the flying capacitors 107, 607 are floating. Furthermore, the inductor 104 is arranged directly between the input node and the output node. The operation state S3/S3 may be used instead of the operation state S0/S0, in case of a duty cycle greater than 50%. Hence, a possible pattern or sequence for operating the converter 650 may be S2/S1-S3/S3-S2/S2-S3/S3-S1/S2-S3/S3-S1/S1-S3/S3.

Figure 8A:
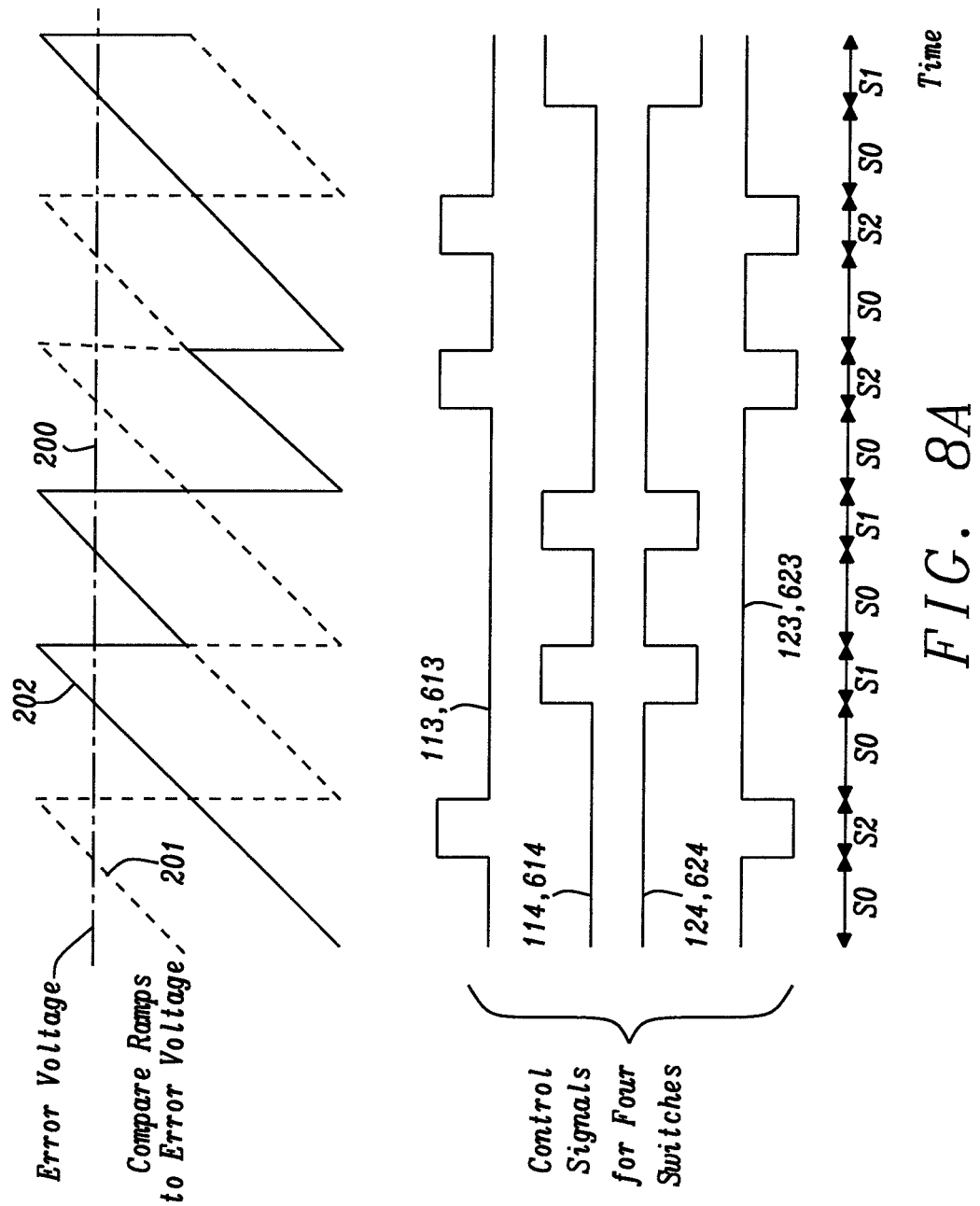
FIG. 8A shows example ramp signals and control signals for controlling the converter of FIG. 6.

A possible way for generating the above-mentioned pattern of operation states is the use of two ramps 201, 202 which are compared with the error voltage 200. As illustrated in FIG. 8A, this comparison provides the control signals 113, 114, 123, 124 for the switches of the converter branch 100. The control signals 613, 614, 623, 624 for the switches of the converter branch 600 are also obtained by the comparison of the error voltage 200 with two additional ramps equal in shape and period to 201, 202 but are phase shifted by 25% of a duration of a cycle of the ramps 201, 202 to guarantee the non-overlapping operation between the converter branches 100, 600. When the error voltage 200 is lower than the first ramp 201, HS1 switch 111 is turned on, and when the opposite is true, LS1 switch 121 is turned on. Moreover, when the error voltage 200 is lower than the second ramp 202 HS2 switch 112 is turned on and when the opposite is true LS2 switch 122 is turned on. By this way, it is possible to demonstrate that the desired pattern S2-S0-S2-S0-S1-S0-S 1-S0 is obtained.

Figure 8B:
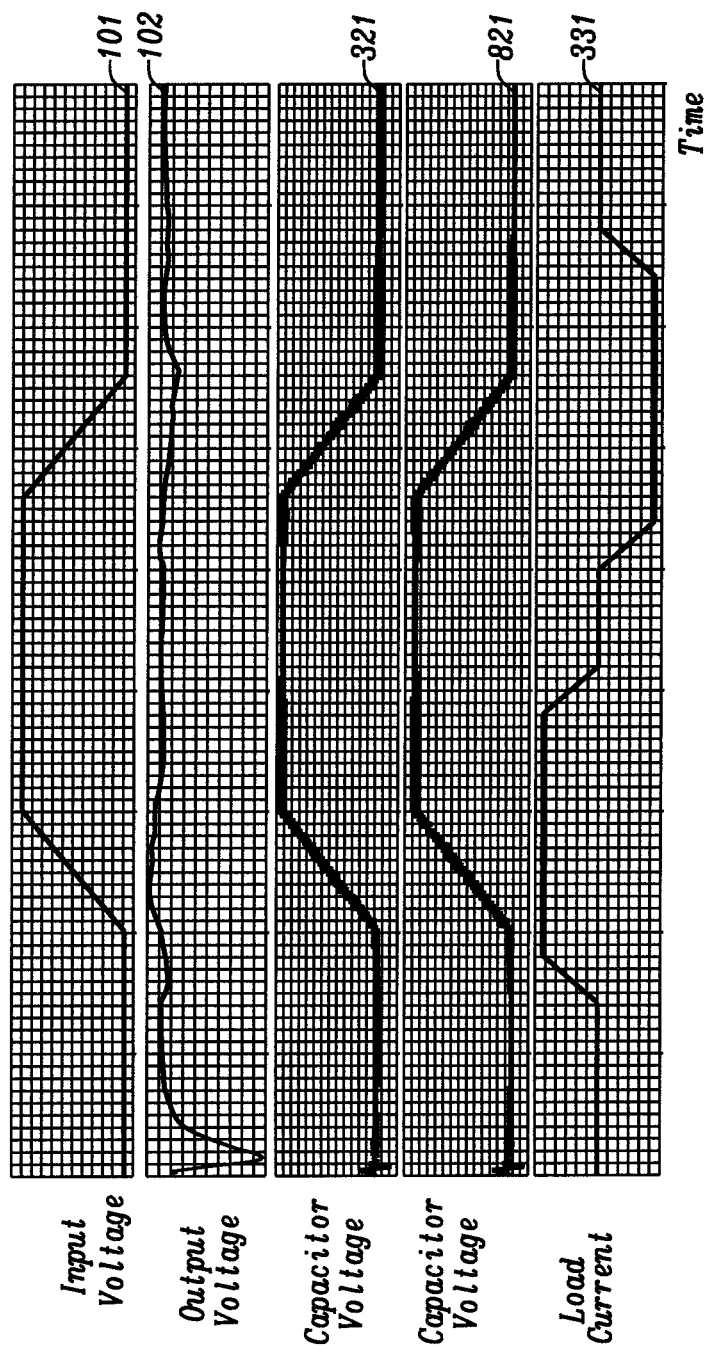
FIG. 8B shows example signals during operation of the interleaved multi-level switching converter of FIG. 6.

FIG. 8B shows simulation results for a situation where the input voltage 101 and the load current 331 change over time. It can be seen how the capacitor voltage 321, 821 of the flying capacitors 107, 607 follows the input voltage 101. Furthermore, it can be seen that regulation of the capacitor voltage 321, 821 also occurs for negative load currents 331. Hence, a multi-level switching converter 650 which is configured to convert an input voltage 101 provided at an input node to an output voltage 102 provided at an output node is described. The multi-level switching converter 650 comprises a first converter branch (or a first branch) 100 comprising a first set of switches 111, 112, 121, 122 and a first flying capacitor 107. Furthermore, the multi-level switching converter 650 comprises a second converter branch (or a second branch) 600 comprising a second set of switches 611, 612, 621, 622 and a second flying capacitor 607. The first and the second branch 100, 600 may be operated in an interleaved and/or phase shifted manner with respect to one another. In particular, the operation states of the first and second branch 100, 600 may at least partially be complementary with respect to one another. In yet other words, the control circuitry 310 of the multi-level switching converter 650 may be configured to control the first set of switches and the second set of switches phase shifted with respect to one another, such that the first converter branch 100 and the second converter branch 600 are operated in an interleaved manner.

The first set of switches 111, 112, 121, 122 may comprise a switch 111 (notably a first high side switch) which is configured to (directly) couple or to decouple the input node with or from a first port of the first flying capacitor 107. Furthermore, the first set of switches 111, 112, 121, 122 may comprise a switch 112 (notably a second high side switch) which is configured to (directly) couple or to decouple the first port of the first flying capacitor 107 with or from an intermediate node 106. Furthermore, the first set of switches 111, 112, 121, 122 may comprise a switch 122 (notably a second low side switch) which is configured to (directly) couple or to decouple the intermediate node 106 with or from a second port of the first flying capacitor 107. Furthermore, the first set of switches 111, 112, 121, 122 may comprise a switch 121 (notably a first low side switch)

which is configured to (directly) couple or to decouple the second port of the first flying capacitor 107 with or from the ground potential 103.

In a corresponding manner, the second set of switches 611, 612, 621, 622 may comprise a switch 611 (notably a first high side switch) which is configured to (directly) couple or to decouple the input node with or from a first port of the second flying capacitor 607.

Furthermore, the second set of switches 611, 612, 621, 622 may comprise a switch 612 (notably a second high side switch) which is configured to (directly) couple or to decouple the first port of the second flying capacitor 607 with or from the intermediate node 106. Furthermore, the second set of switches 611, 612, 621, 622 may comprise a switch 622 (notably a second low side switch) which is configured to (directly) couple or to decouple the intermediate node 106 with or from a second port of the second flying capacitor 607. Furthermore, the second set of switches 611, 612, 621, 622 may comprise a switch 621 (notably a first low side switch) which is configured to couple or to decouple the second port of the second flying capacitor 607 with or from the ground potential 103.

The switches may be or may comprise metal-oxide-semiconductor (MOS) transistors.

Furthermore, the multi-level switching converter 650 may comprise a joint inductor 104 for the first and second branch 100, 600. The inductor 104 may be arranged between the intermediate node 106 and the output node (notably in case of step-down converter). Alternatively, the inductor 104 may be arranged between the intermediate node 106 and the input node (notably in case of a step-up converter). In addition, the multi-level switching converter 650 may comprise an output capacitor 105 which is arranged between the output node and the ground potential 103.

In addition, the multi-level switching converter 650 may comprise control circuitry 310 (e.g. comprising one or more comparators and/or one or more logic circuits). The control circuitry 310 may be configured to control the first and second set of switches to set the output voltage 102 in accordance to a reference voltage 300. For this purpose, the control circuitry 310 may be configured to determine an error voltage 200 which is indicative of the deviation of the output voltage 102 from the reference voltage 300. Furthermore, the control circuitry 310 may be configured to compare the error voltage 200 with a first ramp 201 and with a second ramp 202, respectively (notably the ramps 201, 202 shown in FIG. 8a). The first and second ramp 201, 202 may be shifted with respect to one another by 50% of the duration of the cycle of the first and second ramp 201, 202. The control signals 113, 114, 123, 124, 613, 614, 623, 624 for the first and second set of switches may be determined in a precise manner based on the comparison (notably based on the PWM signals which result from the comparison).

Furthermore, the control circuitry 310 may be configured to control the first and second set of switches to set the capacitor voltages 321, 821 across the first and second flying capacitors 107, 607 in accordance to a target voltage 322. In particular, the capacitor voltage 321 across the first flying capacitor 107 may be set to the target voltage 322, and the capacitor voltage 321 across the second flying capacitor 607 may be set to the target voltage 322. The target voltage 322 may be the input voltage 101 divided by two (notably for a multi-level switching converter 650 which exhibits N=3 levels). In general terms, the multi-level switching converter 650 may exhibit N levels, with N=3 or more, N=4 or more, or N05 or more. The target voltage 322 may be equal to the input voltage 101 divided by N−1.

As such, by appropriate operation of a multi-level switching converter 650 which comprises a least two interleaved (multi-level) converter branches 100, 600, the capacitor voltages 321, 821 across the flying capacitors 107, 607 may be regulated in an efficient and stable manner to a target voltage, wherein the target voltage is (typically) the input voltage 101 divided by two. For this purpose, the control circuitry 310 may be configured to use the first flying capacitor 107 as a charge pump for charging the second flying capacitor 607, and to use the second flying capacitor 607 as a charge pump for charging the first flying capacitor 107 in a repeating and alternating manner.

The control circuitry 310 may be configured to control the first and second set of switches repeatedly according to a sequence of operation states. The sequence of operation states may be performed during a cycle having a certain cycle duration. Subsequent cycles may be repeated with a certain cycle rate (e.g. 10 kHz or more, 100 kHz or more, 1 MHz or more).

The sequence of operation states may comprise at least one operation state (e.g. the operation state S1/S1 and/or the operation state S2/S2), during which the first flying capacitor 107 and the second flying capacitor 607 are arranged in parallel with respect to one another. Furthermore, the sequence of operation states may comprise at least one operation state (e.g. the operation state S1/S2 and/or the operation state S2/S1), during which the first flying capacitor 107 and the second flying capacitor 607 are arranged in series with respect to one another. As a result of alternating a serial and a parallel arrangement of the flying capacitors 107, 607, the capacitor voltages 321, 821 across the flying capacitors 107, 607 may be regulated in an efficient and precise manner.

The sequence of operation states may comprise at least one operation state (e.g. the operation state S0/S0) during which the first flying capacitor 107 and the second flying capacitor 607 are floating. Such an operation state may be used to regulate the output voltage 102.

In particular, the sequence of operation states may comprise a first operation state (e.g. the operation state S1/S1) during which the first flying capacitor 107 and the second flying capacitor 607 are each arranged in parallel to a serial arrangement of the inductor 104 and the output capacitor 105 (or an input capacitor). Alternatively, or in addition, the sequence of operation states may comprise a second operation state (e.g. the operation state S2/S2) during which the first flying capacitor 107 and the second flying capacitor 607 are arranged in parallel to one another, between the input node and an intermediate node 106. Alternatively, or in addition, the sequence of operation states may comprise a third operation state (e.g. the operation state S0/S0) during which the first and the second flying capacitor 107, 607 are floating, and during which the inductor 104 is arranged in parallel to the output capacitor 105 (or to an input capacitor). Alternatively, or in addition, the sequence of operation states may comprise a fourth operation state (e.g. the operation state S1/S2) during which the first flying capacitor 107 is arranged between the intermediate node 106 and the ground potential 103, and during which the second flying capacitor 607 is arranged between the input node and the intermediate node 106. Alternatively, or in addition, the sequence of operation states may comprise a fifth operation state (e.g. the operation state S2/S1) during which the second flying capacitor 607 is arranged between the intermediate node 106 and the ground potential 103, and during which the first flying capacitor 107 is arranged between the input node and the intermediate node 106. Alternatively, or in addition, the sequence of operation states may comprise a sixth operation state (e.g. the operation state S3/S3) during which the first and the second flying capacitor 107, 607 are floating and during which the inductor 104 is arranged between the input node and the output capacitor 105 (or arranged between the output node and an input capacitor). The sixth operation state may be used for duty cycles greater than 50%.

It should be noted that the term input node and output node, and more generally, the term "input" and "output" may be exchanged when using a step-up converter instead of a step-down converter.

By making use of the above-mentioned operation states, the output voltage 102 and the capacitor voltages 321, 821 may be regulated in a precise and efficient manner.

In particular, the sequence of operation states may comprise the fifth operation state (e.g. the operation state S2/S1) followed by the third operation state (e.g. the operation state S0/S0), and/or the second operation state (e.g. the operation state S2/S2) followed by the third operation state (e.g. the operation state S0/S0), and/or the fourth operation state (e.g. the operation state S1/S2) followed by the third operation state (e.g. the operation state S0/S0), and/or the first operation state (e.g. the operation state S1/S1) followed by the third operation state (e.g. the operation S0/S0). The above-mentioned sequence of operation states may be used in case of a duty cycle which is equal to or smaller than 50%. In case of a duty cycle greater than 50%, the third operation state (e.g. the operation state S0/S0) may be replaced by the sixth operation state (e.g. the operation state S3/S3).

In a preferred example the sequence of operation states comprises: the fifth operation state (e.g. the operation state S2/S1) followed by the third operation state (e.g. the operation state S0/S0), and the second operation state (e.g. the operation state S2/S2) followed by the third operation state (e.g. the operation state S0/S0), and the fourth operation state (e.g. the operation state S1/S2) followed by the third operation state (e.g. the operation state S0/S0), and the first operation state (e.g. the operation state S1/S1) followed by the third operation state (e.g. the operation S0/S0). The above-mentioned sequence of operation states may be used in case of a duty cycle which is equal to or smaller than 50%. In case of a duty cycle greater than 50%, the third operation state (e.g. the operation state S0/S0) may be replaced by the sixth operation state (e.g. the operation state S3/S3).

The durations of at least some of the operation states may be modified in order to regulate the output voltage 102 and/or the capacitor voltages 321, 821. In particular, the control circuitry 310 may be configured to repeat the sequence of operation states at a cycle rate. The duration of the fourth operation state (e.g. the operation state S1/S2), the firth operation state (e.g. the operation state S2/S1) and/or the third operation state (e.g. the operation state S0/S0) may be set in dependence of the reference voltage 300. Alternatively, or in addition, the duration of the first operation state (e.g. the operation state S1/S1) and/or the second operation state (e.g. the operation state S2/S2) may be set in dependence of the target voltage 322.

Figure 9:
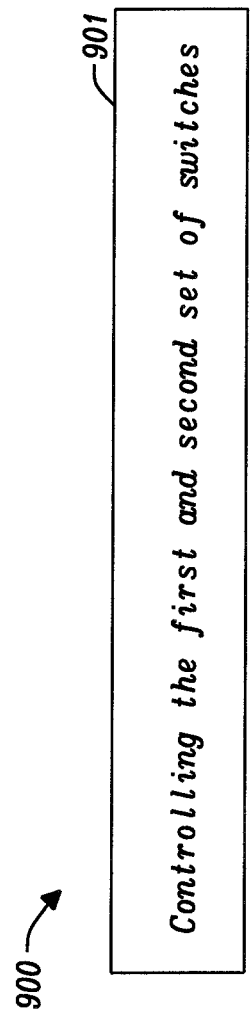
FIG. 9 shows a flow chart of an example method for operating an interleaved multi-level switching converter.

FIG. 9 shows a flow chart of an example method 900 for operating a multi-level switching converter 650 which is configured to convert an input voltage 101 provided at an input node to an output voltage 102 provided at an output node. The method 900 comprises controlling 901 the first and second set of switches to set the output voltage 102 in accordance to a reference voltage 300, and (as a result of this) to set capacitor voltages 321, 821 across the first and second flying capacitors 107, 607 to a target voltage that is (typically) the input voltage 101 divided by two.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A multi-level switching converter which is configured to convert an input voltage provided at an input node to an output voltage provided at an output node; wherein the multi-level switching converter comprises
    a first converter branch comprising a first set of switches and a first flying capacitor;
    a second converter branch comprising a second set of switches and a second flying capacitor;
    a joint inductor for the first and second converter branch; and
    control circuitry configured to control the first and second set of switches to set the output voltage in accordance to a reference voltage, such that capacitor voltages across the first and second flying capacitors are set to a target voltage, wherein the control circuitry is configured to control the first and second set of switches repeatedly according to a sequence of operation states; and
    the sequence of operation states comprises at least one operation state, during which the first flying capacitor and the second flying capacitor are arranged in parallel with respect to one another, and at least one operation state, during which the first flying capacitor and the second flying capacitor are arranged in series with respect to one another.

2. The multi-level switching converter of claim 1, wherein the control circuitry is configured to use the first flying capacitor as a charge pump for charging the second flying capacitor, and to use the second flying capacitor as a charge pump for charging the first flying capacitor in a repeating and alternating manner.

3. The multi-level switching converter of claim 1, wherein the sequence of operation states comprises at least one operation state during which the first flying capacitor and the second flying capacitor are floating.

4. The multi-level switching converter of claim 1, wherein the multi-level switching converter comprises an output capacitor arranged between the output node and a ground potential;
    and
    the sequence of operation states comprises a first operation state during which the first flying capacitor and the second flying capacitor are each arranged in parallel to a serial arrangement of the inductor and the output capacitor.

5. The multi-level switching converter of claim 4, wherein the sequence of operation states comprises, notably in case of a duty cycle of 50% or less,
    the fifth operation state followed by the third operation state;
    the second operation state followed by the third operation state;

the fourth operation state followed by the third operation state; and/or the first operation state followed by the third operation state.

6. The multi-level switching converter of claim 4, wherein the control circuitry is configured to repeat the sequence of operation states at a cycle rate;

set a duration of the fourth operation state, the fifth operation state and/or the third operation state in dependence of the reference voltage.

7. The multi-level switching converter of claim 4, wherein the sequence of operation states comprises, notably in case of a duty cycle of 50% or more, the fifth operation state followed by the sixth operation state;

the second operation state followed by the sixth operation state;

the fourth operation state followed by the sixth operation state; and/or the first operation state followed by the sixth operation state.

8. The multi-level switching converter (650) of claim 4, wherein the control circuitry is configured to repeat the sequence of operation states at a cycle rate;

set a duration of the fourth operation state, the fifth operation state and/or the sixth operation state in dependence of the reference voltage.

9. The multi-level switching converter of claim 1, wherein the sequence of operation states comprises a second operation state during which the first flying capacitor and the second flying capacitor are arranged in parallel to one another, between the input node and an intermediate node;

the inductor is arranged between the intermediate node and the output node.

10. The multi-level switching converter of claim 1, wherein the multi-level switching converter comprises an output capacitor arranged between the output node and a ground potential;

and the sequence of operation states comprises a third operation state during which the first and the second flying capacitor are floating, and during which the inductor is arranged in parallel to the output capacitor.

11. The multi-level switching converter of claim 1, wherein the inductor is arranged between an intermediate node and the output node;

and the sequence of operation states comprises a fourth operation state during which the first flying capacitor is arranged between the intermediate node and a ground potential, and during which the second flying capacitor is arranged between the input node and the intermediate node.

12. The multi-level switching converter of claim 1, wherein the inductor is arranged between an intermediate node and the output node;

and the sequence of operation states comprises a fifth operation state during which the second flying capacitor is arranged between the intermediate node and a ground potential, and during which the first flying capacitor is arranged between the input node and the intermediate node.

13. The multi-level switching converter of claim 1, wherein the sequence of operation states comprises a sixth operation state during which the first and the second flying capacitor are floating, and during which the inductor is arranged between the input node and the output node.

14. The multi-level switching converter of claim 1, wherein the first set of switches comprises a switch which is configured to couple or to decouple the input node with or from a first port of the first flying capacitor;

a switch which is configured to couple or to decouple the first port of the first flying capacitor with or from an intermediate node;

a switch which is configured to couple or to decouple the intermediate node with or from a second port of the first flying capacitor; and a switch which is configured to couple or to decouple the second port of the first flying capacitor with or from a ground potential; and/or the second set of switches comprises a switch which is configured to couple or to decouple the input node with or from a first port of the second flying capacitor;

a switch which is configured to couple or to decouple the first port of the second flying capacitor with or from the intermediate node;

a switch which is configured to couple or to decouple the intermediate node with or from a second port of the second flying capacitor; and a switch which is configured to couple or to decouple the second port of the second flying capacitor with or from the ground potential.

15. The multi-level switching converter of claim 1, wherein the control circuitry is configured to determine an error voltage indicative of a deviation of the output voltage from the reference voltage;

compare the error voltage with a first ramp and a second ramp; wherein the first and second ramp are phase shifted by 50% of a duration of a cycle of the first and second ramp; and determine control signals for the first and/or second set of switches, based on the comparison.

16. The multi-level switching converter of claim 1, wherein the multi-level switching converter is an interleaved switching converter; and/or the first converter branch and the second converter branch are operated in an interleaved manner; and/or the control circuitry is configured to control the first set of switches and the second set of switches phase shifted with respect to one another, such that the first converter branch and the second converter branch are operated in an interleaved manner.

17. The multi-level switching converter of claim 1, wherein the multi-level switching converter exhibits N levels; and/or N is 3 or more, 4 or more, 5 or more; and/or the target voltage is the input voltage divided by N−1.

18. A method for operating a multi-level switching converter which is configured to convert an input voltage provided at an input node to an output voltage provided at an output node; wherein the multi-level switching converter comprises a first converter branch comprising a first set of switches and a first flying capacitor;

a second converter branch comprising a second set of switches and a second flying capacitor; and a joint inductor for the first and second converter branch; and wherein the method comprises controlling the first and second set of switches to set the output voltage in accordance to a reference voltage;

wherein the method further comprises controlling the first and second set of switches repeatedly according to a sequence of operation states; and wherein the sequence of operation states comprises at least one operation state, during which the first flying capacitor and the second flying capacitor are arranged in parallel with respect to one another, and at least one operation state, during which the first flying capacitor and the second flying capacitor are arranged in series with respect to one another.

* * * * *